United States Patent
Goh et al.

(10) Patent No.: US 11,812,127 B2
(45) Date of Patent: Nov. 7, 2023

(54) MONITOR WITH INTEGRATED CAMERA TO ACHIEVE OPTIMIZED VERTICAL DIMENSION

(71) Applicant: Dell Products L.P., Round Rock, TX (US)

(72) Inventors: Chong Beng Mike Goh, Singapore (SG); Meng Wei Lim, Singapore (SG)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/511,893

(22) Filed: Oct. 27, 2021

(65) Prior Publication Data

US 2023/0127461 A1    Apr. 27, 2023

(51) Int. Cl.
*H04N 23/54* (2023.01)
*G03B 17/56* (2021.01)
*H04N 23/57* (2023.01)
*H04N 23/695* (2023.01)

(52) U.S. Cl.
CPC ........... *H04N 23/54* (2023.01); *G03B 17/561* (2013.01); *H04N 23/57* (2023.01); *H04N 23/695* (2023.01)

(58) Field of Classification Search
CPC ... G06F 1/1605; G06F 1/1686; H04N 5/2253; H04N 5/2257; H04N 5/23299; H04N 23/54; H04N 23/57; H04N 23/695; G03B 17/561; H04M 1/0264; H04M 1/0235; H04M 2250/20
See application file for complete search history.

(56) References Cited

U.S. PATENT DOCUMENTS

| | | | | |
|---|---|---|---|---|
| 5,801,919 A * | 9/1998 | Griencewic | ........... | G06F 1/1616 361/679.26 |
| 6,587,151 B1 * | 7/2003 | Cipolla | ................ | G06F 1/1607 D16/202 |
| 6,812,958 B1 * | 11/2004 | Silvester | ............... | G06F 1/1607 348/E5.026 |
| 7,636,124 B2 * | 12/2009 | Yoo | ...................... | H04M 1/0264 455/575.1 |
| 10,880,421 B2 * | 12/2020 | Fan | ....................... | H04N 23/531 |
| 11,363,183 B2 * | 6/2022 | Hsu | ........................ | G06V 40/13 |
| 2008/0266865 A1 * | 10/2008 | Lev | ........................ | G06F 1/1684 362/287 |
| 2010/0284676 A1 * | 11/2010 | Shintani | ............... | H04N 5/2354 396/175 |
| 2012/0037777 A1 * | 2/2012 | Nagao | .................... | F16M 11/10 248/292.12 |

(Continued)

FOREIGN PATENT DOCUMENTS

KR           20140022611 A    *    2/2014

*Primary Examiner* — Chiawei Chen
(74) *Attorney, Agent, or Firm* — Terrile, Cannatti & Chambers; Stephen A. Terrile

(57) ABSTRACT

A system and method are disclosed for providing a display device with a self-tilting retractable camera mechanism. The retractable camera mechanism includes a display device mounting portion, the display device mounting portion being configured to mechanically attach to a display device; and, a retractable camera mounting portion, the retractable camera mounting portion including a self-tilting mechanism, the self-tilting mechanism causing the retractable camera mounting portion to automatically tilt when the retractable camera mounting portion is in an extended position relative to the display device.

12 Claims, 9 Drawing Sheets

(56) References Cited

U.S. PATENT DOCUMENTS

| | | | | |
|---|---|---|---|---|
| 2013/0163977 A1* | 6/2013 | Mack | .................... | H04N 5/2252 |
| | | | | 396/428 |
| 2014/0226063 A1* | 8/2014 | Mack | .................... | G06F 1/1686 |
| | | | | 348/376 |
| 2016/0098138 A1* | 4/2016 | Park | ..................... | G06F 1/1686 |
| | | | | 345/173 |
| 2017/0374248 A1* | 12/2017 | Eromaki | .............. | H04N 5/2257 |
| 2018/0103183 A1* | 4/2018 | Liu | ......................... | G03B 17/02 |
| 2018/0232014 A1* | 8/2018 | Zhu | ........................ | G06F 1/1616 |
| 2018/0292866 A1* | 10/2018 | Tucker | ................. | G06F 1/1686 |
| 2019/0166236 A1* | 5/2019 | Zeng | ..................... | H04N 5/2253 |
| 2019/0166310 A1* | 5/2019 | Yang | ..................... | H04N 5/2252 |
| 2019/0272005 A1* | 9/2019 | Wickett | ............... | G06F 1/1607 |
| 2020/0064882 A1* | 2/2020 | Chiu | ..................... | G06F 1/1605 |
| 2020/0329131 A1* | 10/2020 | Han | ...................... | G06F 1/1658 |
| 2020/0336575 A1* | 10/2020 | Li | ........................ | H04M 1/0264 |
| 2020/0336635 A1* | 10/2020 | Zhou | .................... | G03B 17/561 |
| 2021/0136284 A1* | 5/2021 | Gopalakrishna | ..... | H04N 5/2252 |
| 2021/0149439 A1* | 5/2021 | Tsai | ...................... | G06F 1/1686 |
| 2021/0157370 A1* | 5/2021 | Tam | ..................... | G06F 1/1686 |
| 2021/0389648 A1* | 12/2021 | Zhang | ................... | F16M 11/08 |
| 2022/0171258 A1* | 6/2022 | Chang | ................. | H04N 5/2254 |
| 2022/0210303 A1* | 6/2022 | Chou | ................... | H04N 5/2251 |
| 2023/0047594 A1* | 2/2023 | Wallace | .............. | G03B 17/561 |

\* cited by examiner

MONITOR WITH INTEGRATED CAMERA TO ACHIEVE OPTIMIZED VERTICAL DIMENSION

BACKGROUND OF THE INVENTION

Field of the Invention

The present invention relates to information handling systems. More specifically, embodiments of the invention relate to integrating a camera with a display device.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

A system, method, and computer-readable medium are disclosed for a display device with a self-tilting integrated retractable camera mechanism.

More specifically, in one embodiment the invention relates to an integrated camera mechanism for integration within a display device, comprising: a display device mounting portion, the display device mounting portion being configured to mechanically attach to a display device; and, a retractable camera mounting portion, the retractable camera mounting portion including a self-tilting mechanism, the self-tilting mechanism causing the retractable camera mounting portion to automatically tilt when the retractable camera mounting portion is in an extended position relative to the display device.

In another embodiment the invention relates to a display system comprising: a display device; and, an integrated camera mechanism, the integrated camera mechanism comprising a display device mounting portion, the display device mounting portion being configured to mechanically attach to a display device; and, a retractable camera mounting portion, the retractable camera mounting portion including a self-tilting mechanism, the self-tilting mechanism causing the retractable camera mounting portion to automatically tilt when the retractable camera mounting portion is in an extended position relative to the display device.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
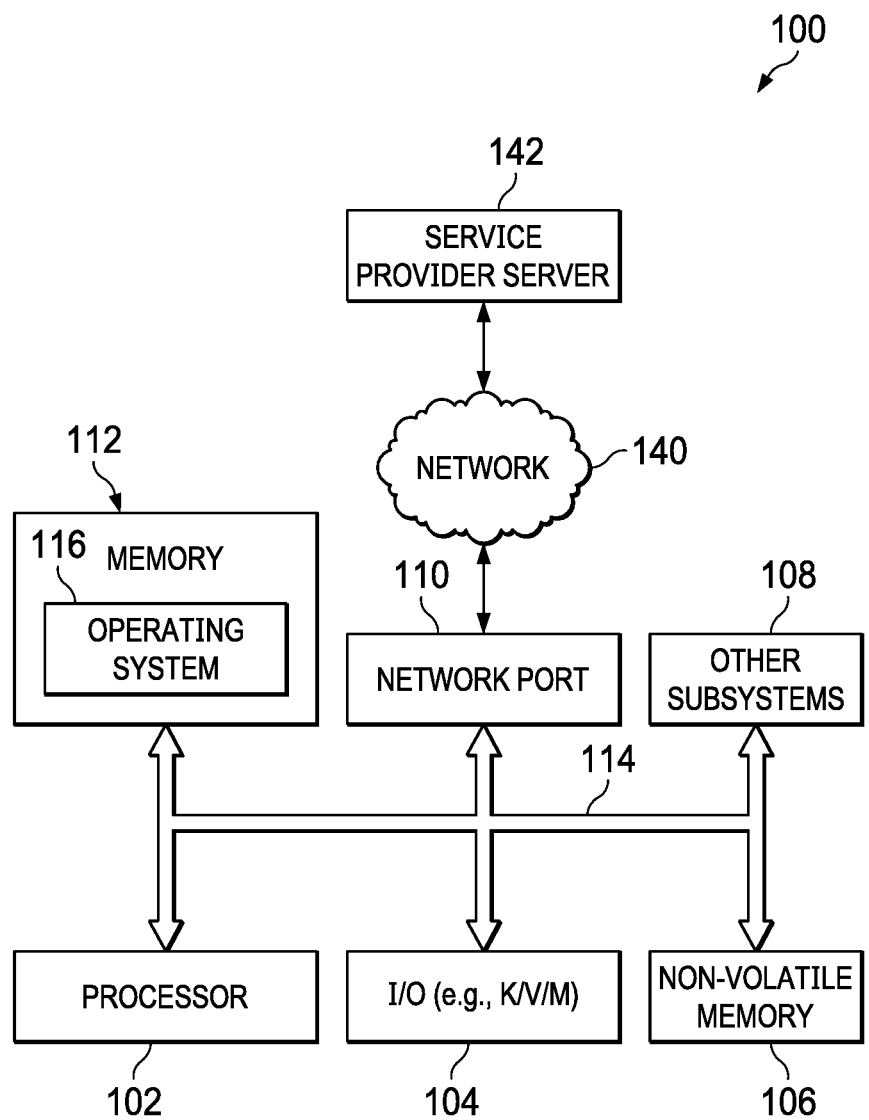
FIG. 1 shows a general illustration of components of an information handling system as implemented in the system and method of the present invention.

Certain aspects of the present disclosure reflect an appreciation that camera enabled display devices are becoming popular for work and social collaboration. Certain aspects of the present disclosure reflect an appreciation that known display devices often have integrated cameras which are located at the top center of the display, either encased within the display housing or standing out on top of housing. The former configuration often appears to have larger display border whereas the monitor form outline continuity would be broken with the shape and form of camera sitting over the display outline in the latter, which can be viewed as an industrial design limitation. On the aspect of privacy some users prefer the camera to be kept and concealed which can pose a constraint on these monitors unless additional mechanical feature like shutter are incorporated.

Certain aspects of the present disclosure include an appreciation that known camera enabled display devices may have an integrated retractable camera module that pops up at the top center of display device upon manual activation of a user's finger. This design makes it possible to have thin top monitor border and meet user's privacy need when the camera is retracted. However, with the known integrated retractable camera module, to achieve video output screen with unconcealed field of view while achieving the user's facial positioning centered towards the screen, the pop-up camera module is often positioned at a significant height above the top of display device with the need of a forward pre-tilt of the camera printed board circuit assembly built into the camera module housing. Such a camera module footprint can render the retractable camera module less aesthetic in overall industrial design perception as well as increased overall monitor standing height A system and method are disclosed for providing a display device with a self-tilting integrated retractable camera mechanism. More specifically, incorporating a forward tilt action on the camera module, significantly reduces the vertical footprint of integrated camera housing. In certain embodiments, the camera printed circuit board module is positioned at a more frontal location above the display device housing so that the camera's field of view can be shifted forward and to a lower position without the issue of view blockage due to the top of monitor housing. In certain embodiments, the camera module housing includes a self forward tilt function which includes a top tilting camera housing and an inner mechanical vertically sliding housing connected together via revolute joints at both ends. In certain embodiments, the top housing self-tilting movement is enabled by pre-loaded torsional springs installed through a rotating pivot of revolute joints.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108. In certain embodiments, the display device is configured to include an integrated camera. In certain embodiments, the integrated camera is retractable. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116. In one embodiment, the information handling system 100 is able to download the operating system 116 from the service provider server 142. In another embodiment, the operating system 116 is provided as a service from the service provider server 142.

Figure 2:
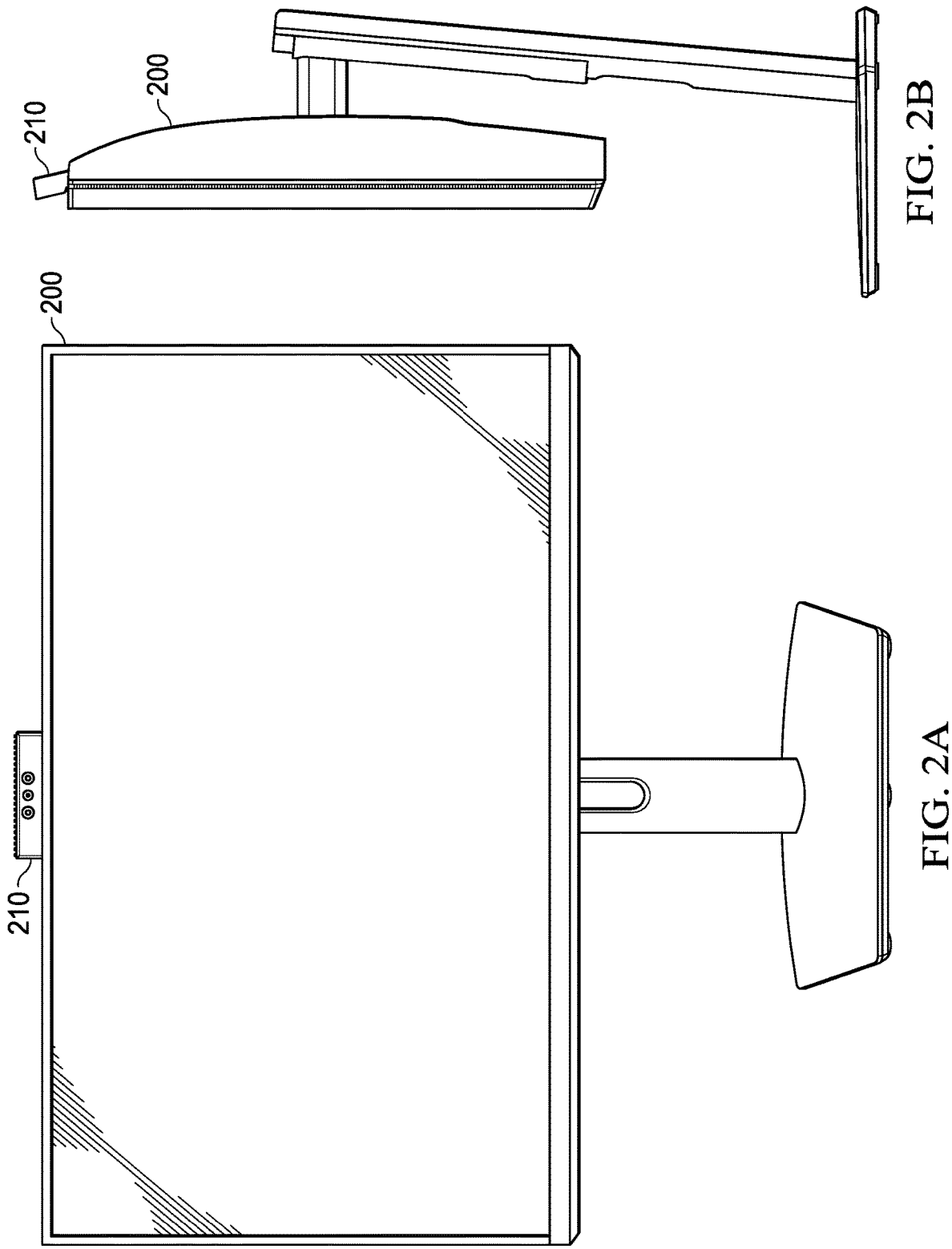
FIG. 2A shows a front view of a display device with an integrated camera in accordance with an embodiment of the present invention.
FIG. 2B shows a side view of a display device with an integrated camera in accordance with an embodiment of the present invention.

FIG. 2A shows a front view of a display device 200 with an integrated camera mechanism 210 in accordance with an embodiment of the present invention. FIG. 2B shows a side view of a display device 200 with an integrated camera 210 mechanism in accordance with an embodiment of the present invention. In certain embodiments, the integrated camera mechanism provides a webcam function. As used herein, a webcam function refers to using a video camera to stream an image or video, which can include audio information as well, in real time through a network such as network 140. In certain embodiments, the integrated camera 210 includes a tilt mechanism that causes the camera to automatically tilt when extended from the display device. In certain embodiments, the integrated camera mechanism 210 is height optimized. In certain embodiments, the height of the integrated camera mechanism 210 when extended is substantially (e.g., +/−15%) 65 percent of the height of a known integrate camera for a display device. In certain embodiments, the height of the integrated camera mechanism 210 is substantially (e.g., +/−15%) 20.65 mm compared to a known integrated camera for a display device having a height of substantially (e.g., +/−15%) 29.94 mm.

Figure 3:
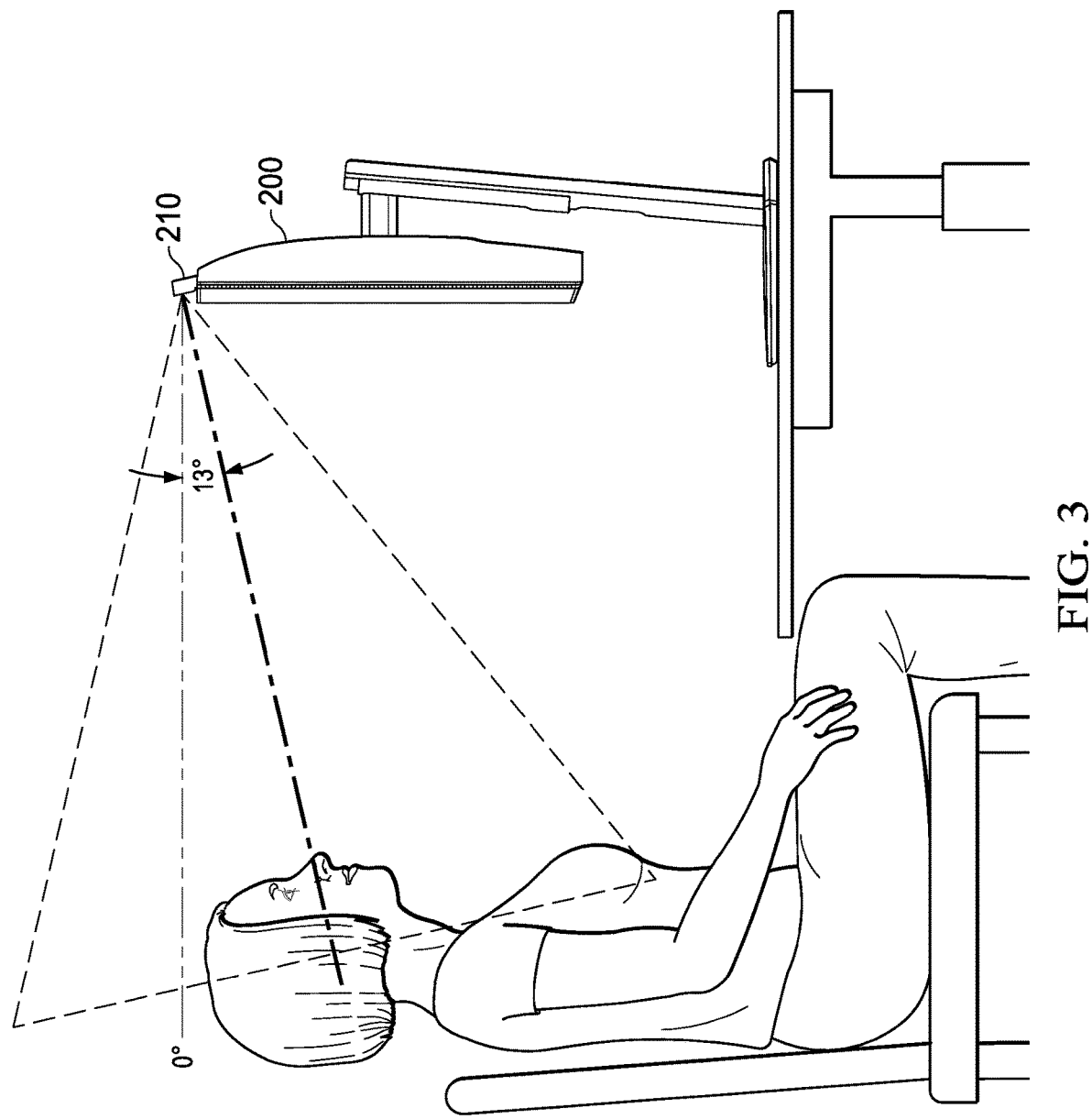
FIG. 3 shows a side view of a display device with an integrated camera in operation in accordance with an embodiment of the present invention.
Figure 4:
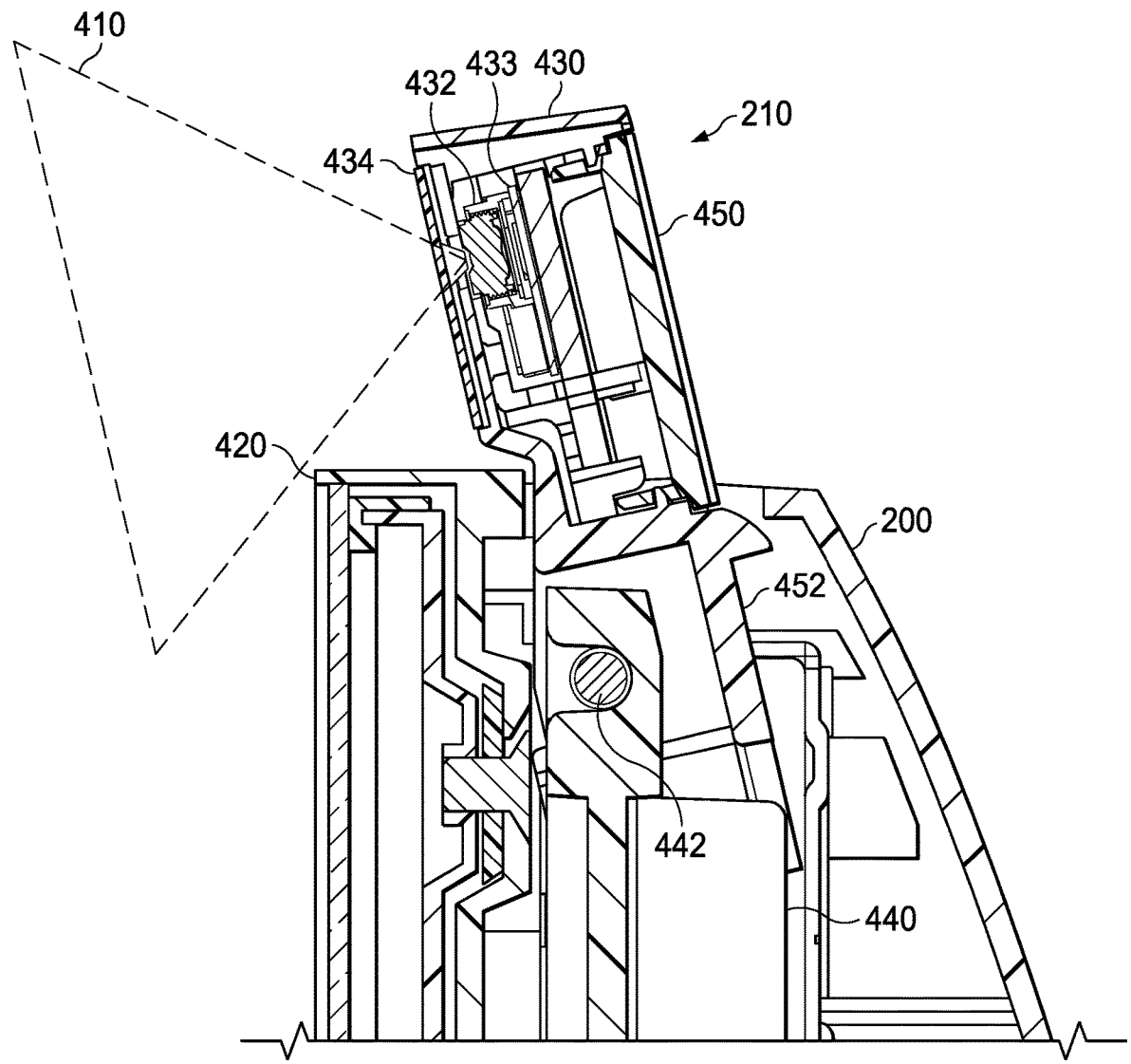
FIG. 4 shows a cut away side view of a portion of a display device with an integrated camera in accordance with an embodiment of the present invention.

FIG. 3 shows a side view of a display device with an integrated camera mechanism 210 in operation in accordance with an embodiment of the present invention. FIG. 4 shows a cut away side view of a portion of a display device 200 with an integrated camera mechanism 210 in accordance with an embodiment of the present invention. In certain embodiments, the integrated camera is configured to automatically tilt to an angle of substantially (e.g., +/−15%) 13 degrees from vertical. Such an automatic tilt angle provides a direct path for viewing a face of a user who is interacting with the integrated camera. Additionally, in certain embodiments, by configuring the integrated camera mechanism 210 to automatically tilt, the integrated camera provides a field of view (FOV) 410 which is clear of a top edge 420 of the display device 200.

In certain embodiments, the integrated camera mechanism 210 includes a camera mounting portion 430 into which a camera device 432 is mounted. In certain embodiments, the camera device 430 includes a video camera as well as one or more microphones. In certain embodiments, the camera device 432 is attached to a camera printed circuit board assembly 433. The camera device 430 and the camera printed circuit board assembly 433 are mounted in parallel with a front wall 434 of the camera mounting portion 430. Accordingly, the camera device 430 tilts when the camera mounting portion tilts. Because the camera device 432 and the camera printed circuit board assembly 433 are located within the self-tilting camera mounting portion, there is no need to pre-position the camera device and the camera printed circuit board assembly at an already tilted position, which is what was needed in many known integrated camera solutions.

In certain embodiments, the camera mounting portion 430 is mechanically coupled to a display device mounting portion 440. In certain embodiments, the display device mounting portion 440 mounts the integrated camera mechanism 210 to the display device 200. In certain embodiments, the camera mounting portion 430 pivots about a hinge 442. In certain embodiments, the hinge functions as a revolute joint between the camera mounting portion 430 and the display device mounting portion 440. In certain embodiments, the camera mounting portion 430 includes an external camera mounting portion 450 and an internal camera mounting portion 452. The external camera mounting portion 450 extends from a closed position, in which the camera mounting portion 450 is contained within the display device housing to an extended position, in which the camera mounting portion 450 is external to the display device housing such that the camera device 432 is usable. In certain embodiments, the camera mounting portion 430 and the display device mounting portion 440 provide the integrated camera mechanism 210.

Figure 5:
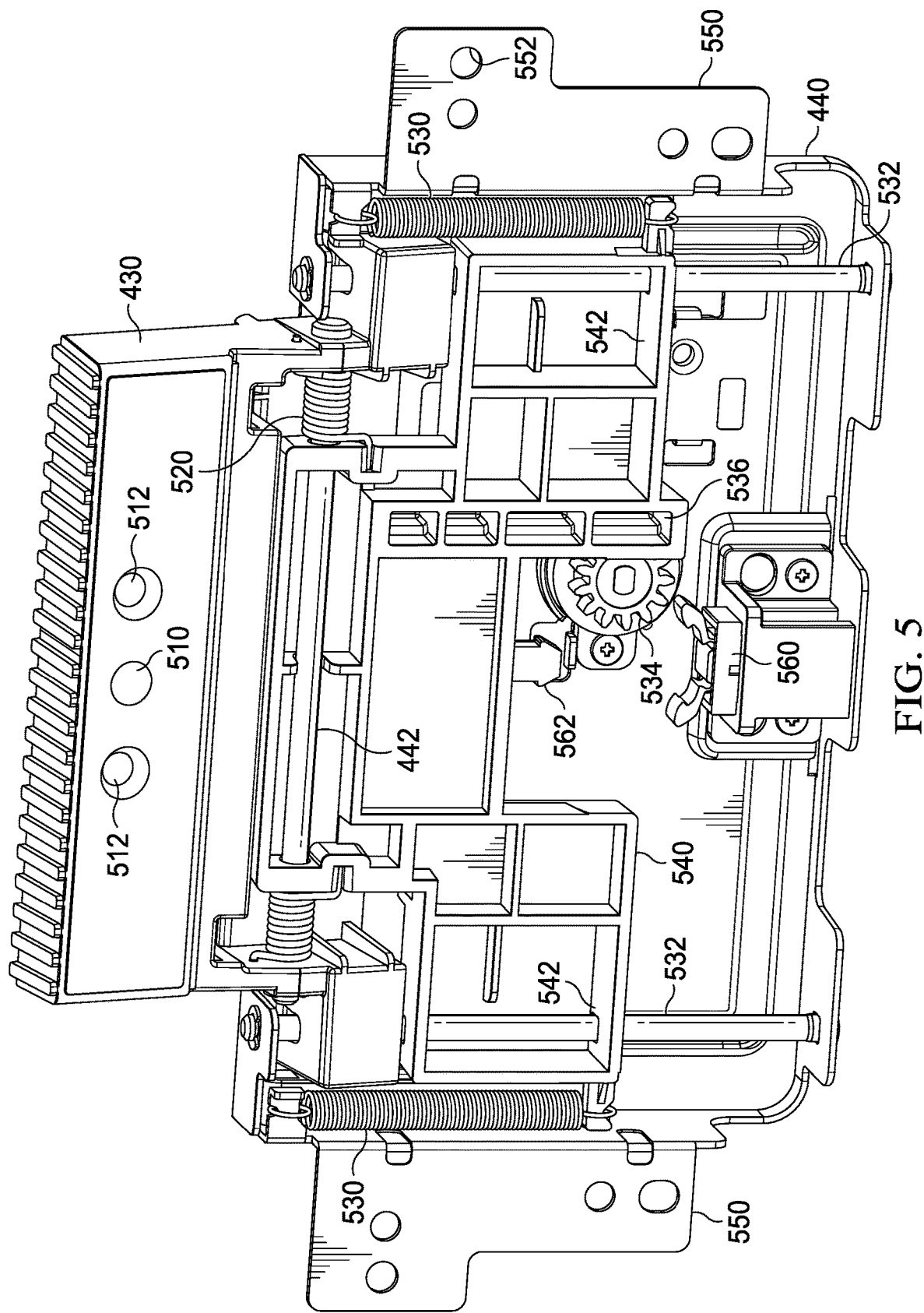
FIG. 5 shows a cut away perspective view of display device integrated camera in accordance with an embodiment of the present invention.
Figure 6B:
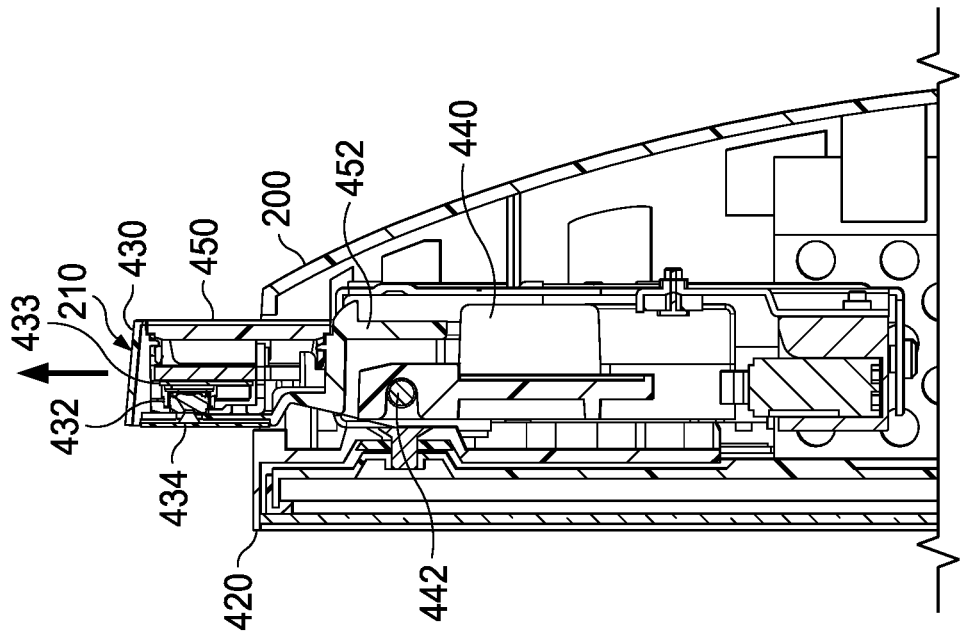
FIGS. 6A, 6B, 6C and 6D show cut away side views of a portion of a display device with an integrated camera as the camera is extended from the display device in accordance with an embodiment of the present invention.
Figure 6A:
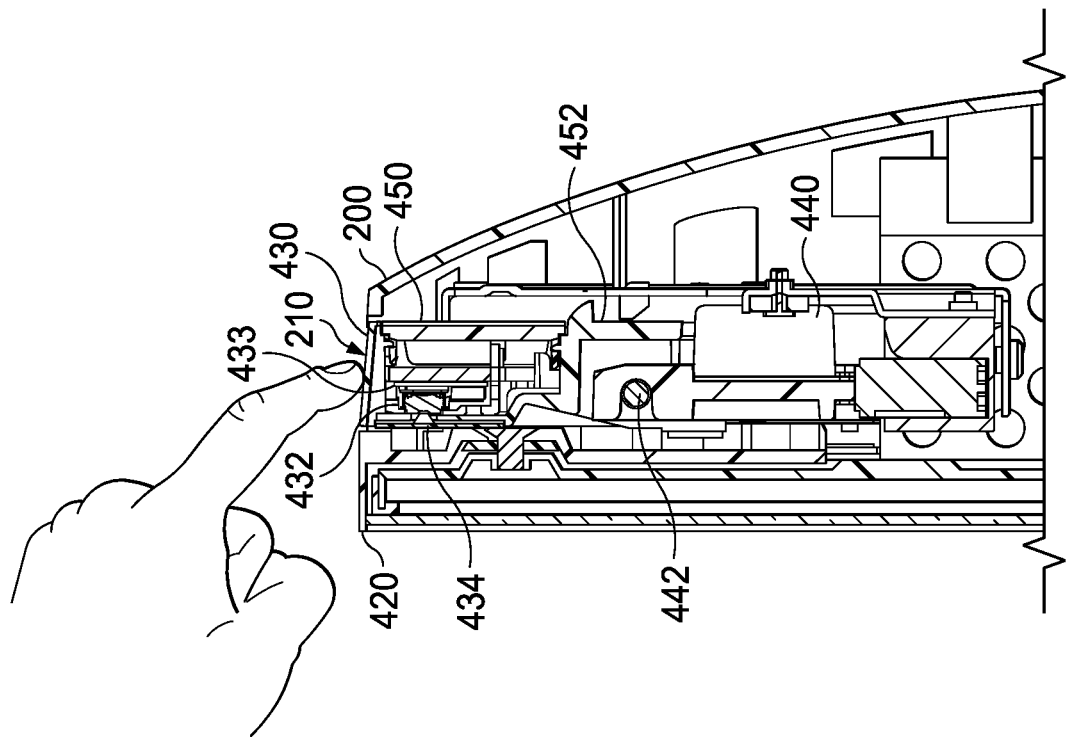
Figure 6C:
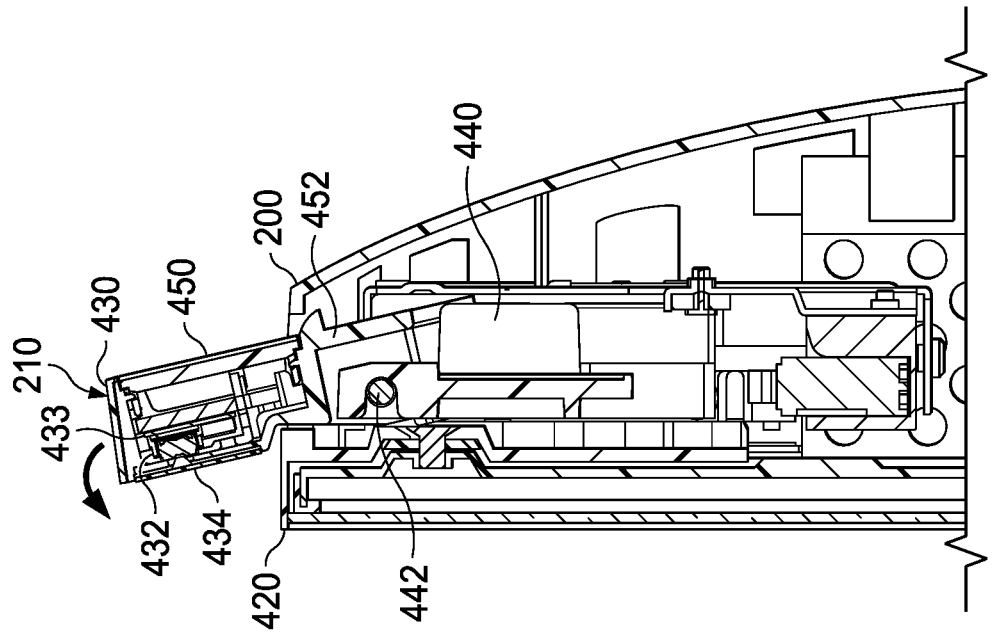
Figure 6D:
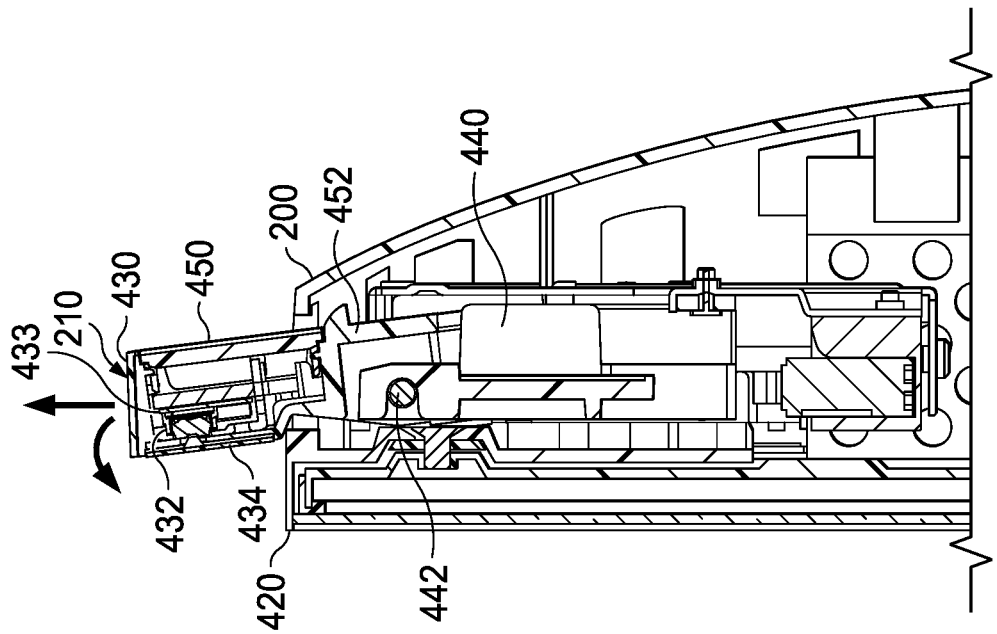
Figure 7B:
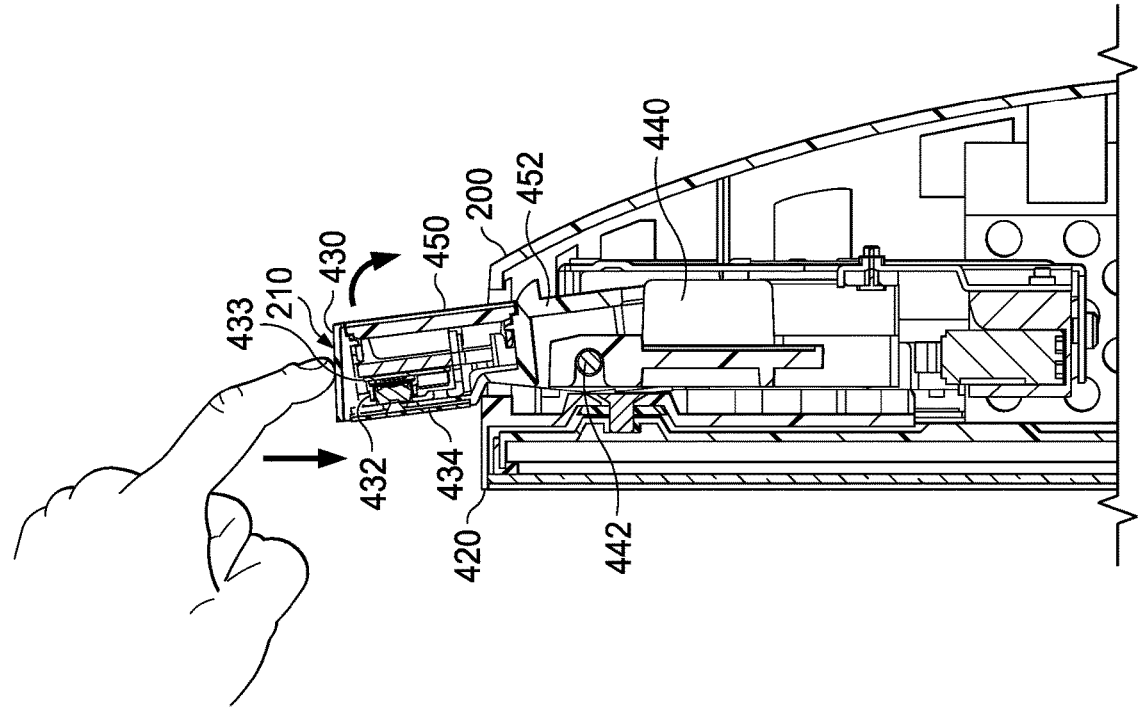
FIGS. 7A, 7B, 7C and 7D show cut away side views of a portion of a display device with an integrated camera as the camera is inserted into the display device in accordance with an embodiment of the present invention.
Figure 7A:
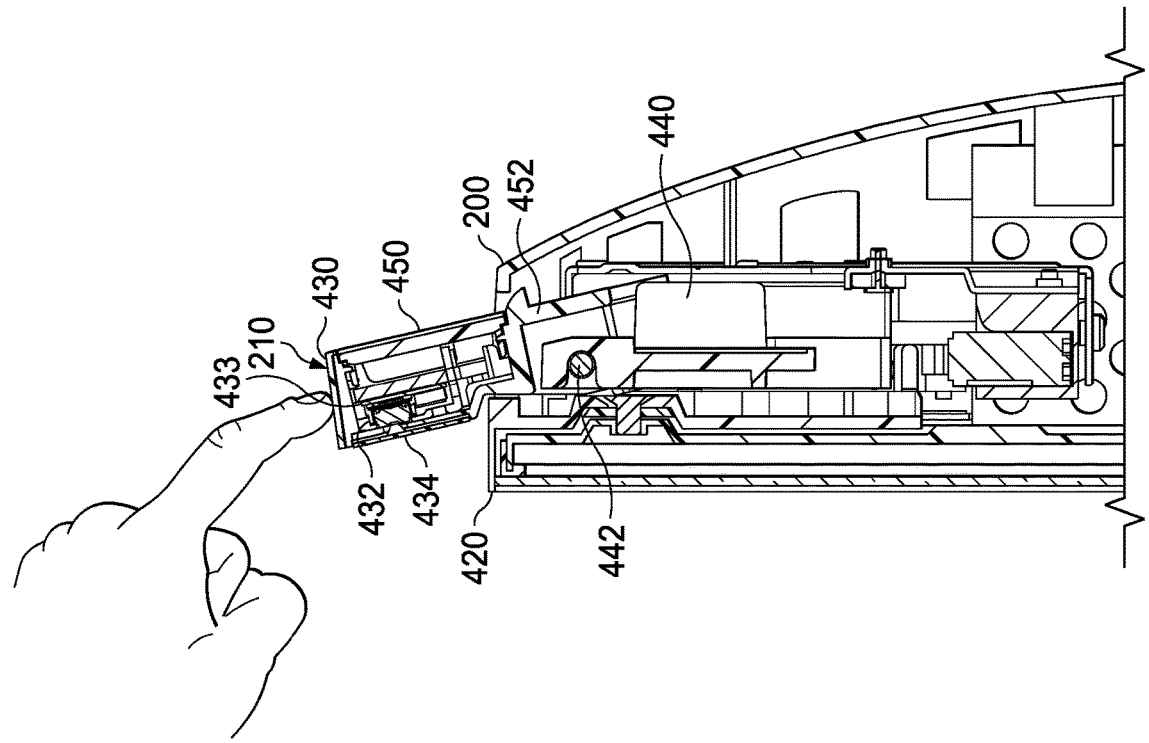
Figure 7D:
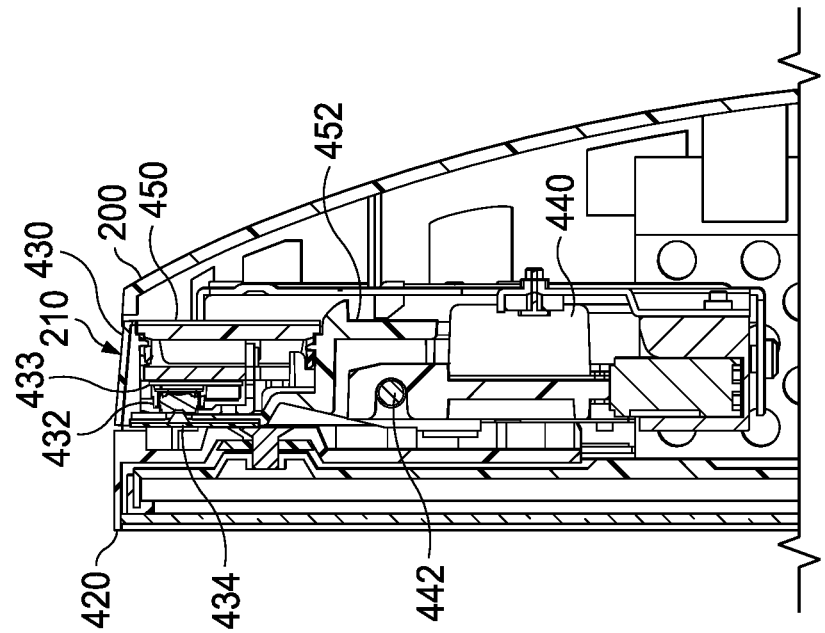
Figure 7C:
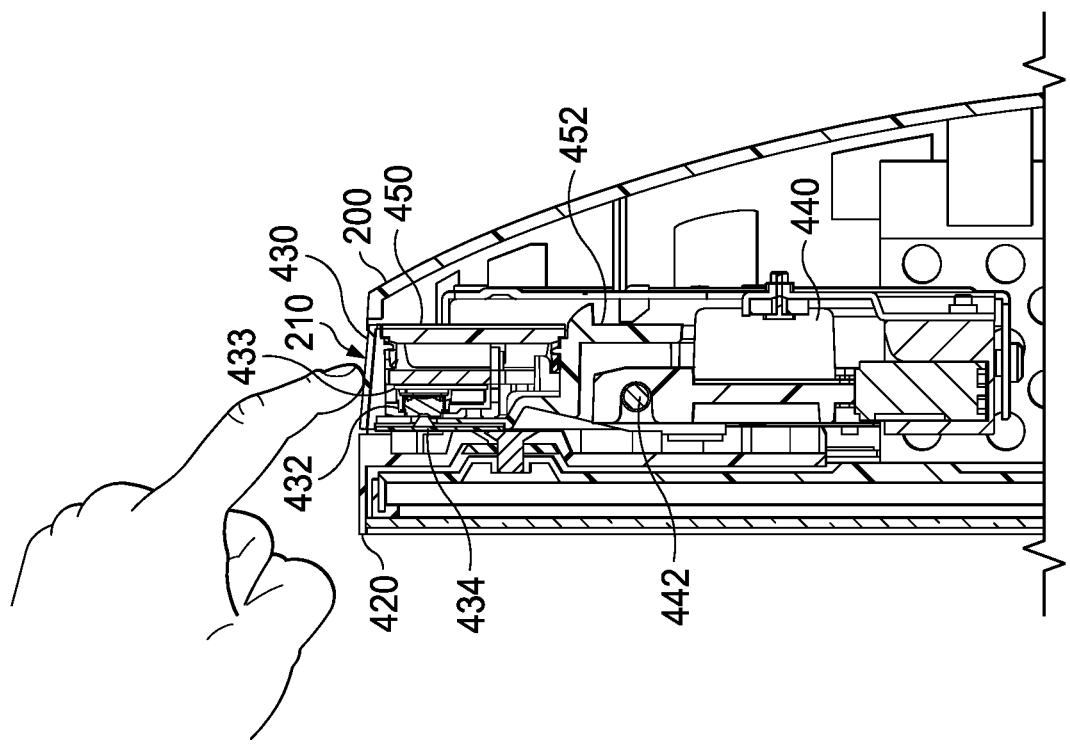

FIG. 5 shows a cut away perspective view of display device integrated camera mechanism 210 in accordance with an embodiment of the present invention. In certain embodiments, the camera mounting portion 430 defines an aperture 510 via which a camera lens has access when the camera mounting portion is in the extended position. In certain embodiments, the camera mounting portion 430 defines one or more apertures 512 via which Infrared (IR) sensors are accessible when the camera mounting portion is in the extended position. In certain embodiments, the integrated camera mechanism 210 includes one or more torsional springs 520 that are mounted to the hinge 442. In certain embodiments, the combination of a torsional spring and the hinge 442 provide a self-tilting mechanism. In certain embodiments, the torsional springs 520 provide a rotating force to cause the camera mounting portion 430 to tilt in a forward direction when the camera mounting portion 430 is in the extended position.

In certain embodiments, the display device housing portion 440 includes one or more coil springs 530. In certain embodiments, the coil springs extend when the camera mounting portion 430 is in the retracted position. In certain embodiments, the coil springs 530 apply a vertical force to the camera mounting portion 430 to cause the camera mounting portion 430 to automatically extend from the retracted position to the extended position. In certain embodiments, the display device housing portion 440 includes one or more guide posts 532. In certain embodiments, the display device housing portion includes a rotational gear 534 which interacts with a gear 536. In certain embodiments, the gear 536 is integrally mounted to a camera mounting base portion 540. In certain embodiments, the gear 536 functions as a dampener. In certain embodiments, the camera mounting base portion 440 defines apertures 542 through which the guide posts 532 are mounted.

In certain embodiments, the display device housing portion 440 includes a rear housing portion 446. In certain embodiments, the display device housing portion 440 includes one or more mounting portions 550. In certain embodiments, the mounting portion 550 is mechanically attached to the rear housing portion 446. In certain embodiments, the mounting portions 550 are integral with the rear housing portion. As used herein integral refers to a composition where multiple portions are formed from a single piece of material. In certain embodiments, the mounting portions 550 each define one or more apertures 552 via which the integrated camera mechanism 210 is mechanically attached to the display device 200.

In certain embodiments, the display device housing portion 440 includes a lock and release mechanism 560 and a projection 562. In certain embodiments, the lock and release mechanism 560 is mechanically attached to the rear housing portion 446 of the display device housing portion 440. In certain embodiments, the projection 562 is mechanically attached to the camera mounting base portion 540. In certain embodiments, the projection 562 is integral with the display device housing portion.

FIGS. 6A, 6B, 6C and 6D show cut away side views of a portion of a display device with an integrated camera as the camera is extended from the display device in accordance with an embodiment of the present invention. More specifically, pressing down on the integrated camera housing releases a lock and release mechanism 560 (see e.g., FIG. 6A). Extended springs (e.g., springs 530) in the integrated camera mechanism then elevates the camera housing portion 430 of the integrated camera mechanism 210 upward, to extend vertically from the display device 200 (see e.g., FIG. 6B). Torsion springs 520 in the integrated camera mechanism cause the camera housing portion 430 of the integrated camera mechanism 210 to tilt forward as the camera housing portion 430 elevates toward the top of its extension (see e.g., FIG. 6C). As the camera housing portion 430 reaches the top of its extension, the camera housing portion 430 tilts to its predetermined tilt angle (see e.g., FIG. 6D). In certain embodiments, the tilt angle is substantially 13 degrees from vertical.

FIGS. 7A, 7B, 7C and 7D show cut away side views of a portion of a display device with an integrated camera as the camera is retracted into the display device in accordance with an embodiment of the present invention. More specifically, pressing down on the integrated camera housing start the process of inserting the camera housing into the display device (see e.g., FIG. 7A). As downward pressure is applied to the integrated camera housing the camera housing rotates rearwardly as well as moving into the display device (see e.g., FIG. 7B). The rearward movement is assisted by the angled wall located toward the bottom front of the camera housing portion 430. When the camera housing reaches the bottom, a pressing motion causes the lock and release mechanism 560 to engage the protrusion and thus to lock the camera housing in place (see e.g., FIG. 7C). The camera housing is thus fully retracted within the display device (see e.g., FIG. 7D).

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. An integrated camera mechanism for integration within a display device, comprising:
   a display device mounting portion, the display device mounting portion being configured to mechanically attach within a top surface of a display device; and,
   a retractable camera mounting portion, the retractable camera mounting portion including a self-tilting mechanism, the self-tilting mechanism causing the retractable camera mounting portion to automatically tilt in a forward direction when the retractable camera mounting portion is in an extended position relative to the top of the display device, the tilt in the forward direction enabling the camera to provide a field of view which is clear of the top of the display device.

2. The integrated camera mechanism of claim 1, wherein:
   the self-tilting mechanism comprises a hinge and a torsional spring, the torsional spring providing a rotating force about the hinge to cause the retractable camera mounting portion to tilt in a forward direction when the camera mounting portion moves from a retracted position to the extended position.

3. The integrated camera mechanism of claim 1, wherein:
the display device mounting portion includes a coil spring, the coil spring applying a vertical force to cause the retractable camera mounting portion to move from the retracted position to the extended position.

4. The integrated camera mechanism of claim 1, wherein:
the display device mounting portion includes a lock and release mechanism, the lock and release mechanism locking the retractable camera mounting portion in the retracted position, the lock and release mechanism releasing the retractable camera mounting portion when the camera mounting portion moves from a retracted position to the extended position.

5. The integrated camera mechanism of claim 4, wherein:
the retractable camera mounting portion includes a protrusion, the protrusion interacting with the lock and release mechanism to lock and release the retractable camera mounting portion.

6. The integrated camera mechanism of claim 1, wherein:
the retractable camera mounting portion includes a camera device and a camera printed circuit board assembly, the camera device and the camera printed circuit board assembly being positioned in parallel with a front wall of the retractable camera mounting portion.

7. A display system comprising:
a display device; and,
an integrated camera mechanism, the integrated camera mechanism comprising
  a display device mounting portion, the display device mounting portion being configured to mechanically attach within a top surface of the display device; and,
  a retractable camera mounting portion, the retractable camera mounting portion including a self-tilting mechanism, the self-tilting mechanism causing the retractable camera mounting portion to automatically tilt in a forward direction when the retractable camera mounting portion is in an extended position relative to the top of the display device, the tilt in the forward direction enabling the camera to provide a field of view which is clear of the top of the display device.

8. The display system of claim 7, wherein the instructions executable by the processor are further configured for:
the self-tilting mechanism comprises a hinge and a torsional spring, the torsional spring providing a rotating force about the hinge to cause the retractable camera mounting portion to tilt in a forward direction when the camera mounting portion moves from a retracted position to the extended position.

9. The display system of claim 7, wherein:
the display device mounting portion includes a coil spring, the coil spring applying a vertical force to cause the retractable camera mounting portion to move from the retracted position to the extended position.

10. The display system of claim 7, wherein:
the display device mounting portion includes a lock and release mechanism, the lock and release mechanism locking the retractable camera mounting portion in the retracted position, the lock and release mechanism releasing the retractable camera mounting portion when the camera mounting portion moves from a retracted position to the extended position.

11. The display system of claim 10, wherein:
the retractable camera mounting portion includes a protrusion, the protrusion interacting with the lock and release mechanism to lock and release the retractable camera mounting portion.

12. The display system of claim 7, wherein:
the retractable camera mounting portion includes a camera device and a camera printed circuit board assembly, the camera device and the camera printed circuit board assembly being positioned in parallel with a front wall of the retractable camera mounting portion.

\* \* \* \* \*